(12) United States Patent
Roeder et al.

(10) Patent No.: US 7,467,228 B2
(45) Date of Patent: Dec. 16, 2008

(54) DIVERSIFIED HOST BASED ROUTE SELECTION METRIC

(75) Inventors: Michael T. Roeder, Roseville, CA (US); Mark Gooch, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 924 days.

(21) Appl. No.: 10/648,148

(22) Filed: Aug. 25, 2003

(65) Prior Publication Data

US 2005/0050223 A1 Mar. 3, 2005

(51) Int. Cl.
*G06F 15/173* (2006.01)

(52) U.S. Cl. .................................. 709/240; 709/242

(58) Field of Classification Search ................. 709/240, 709/242
See application file for complete search history.

(56) References Cited

U.S. PATENT DOCUMENTS

| 6,801,502 B1 * | 10/2004 | Rexford et al. ............... 370/235 |
| 6,947,931 B1 * | 9/2005 | Bass et al. ..................... 707/6 |
| 2004/0250127 A1 * | 12/2004 | Scoredos et al. ............ 713/201 |

* cited by examiner

*Primary Examiner*—Jason Cardone
*Assistant Examiner*—Chirag R Patel (57) ABSTRACT

An embodiment of the invention evaluates the suitability of routes for use in a network route cache. An embodiment of the invention allows the use of network routing caches to be optimized such that routes that are not used to route to a large number of destinations can be offloaded into a less expensive host route cache.

40 Claims, 5 Drawing Sheets

DIVERSIFIED HOST BASED ROUTE SELECTION METRIC

TECHNICAL FIELD

Embodiments of the present invention relate generally to communication networks, and more particularly to a diversified host based route selection metric.

BACKGROUND

It is desirable to implement routing systems that search network route caches to find the forwarding information for packets to be routed rather than searching a complete forwarding information base, FIB, that contains the forwarding information for all active routes for that purpose; this invention provides a mechanism for efficiently distributing the routing load between a network route cache and a host route cache (or optionally a FIB.) It is desirable to distribute the routing load between a network route cache and a host route cache efficiently because it reduces the number of entries that must be supported in those caches.

A router is any device that is capable of routing information between networks using a FIB, that it uses to find the forwarding information for packets destined for all known networks. A known network or host may be defined as a network or host for which there is a route in the FIB that has valid forwarding information.

A router may employ a variety of mechanisms to route the packets. The router may route packets by searching the FIB for a route to the destination of the packets and then forwarding the packet with the forwarding information from the matching route in the FIB. In addition to searching the FIB, a router may employ caching mechanisms in hardware or in software that hold forwarding information for frequently accessed destinations. These caching mechanisms may employ any combination of a host route cache and a network route cache, at any one time the caches are capable of routing to only a subset of the destinations that are accessible using the information from the FIB. Both of these caches are searched with the destination internet protocol, IP, address of the packet to be routed. The entries in the host route cache will match at most one address, while the entries in a network route cache may match one or more addresses. The entries in the network route cache and in the host route cache will contain forwarding information that is to be used for packets that are routed using a matching cache entry. The advantage of using these caches is that it is less expensive to build a high performance routing cache than it is to build a high performance FIB, as a result cost savings can be realized by using a set of high performance caches (network and host route caches) and a lower performance FIB in place of a single high performance (and expensive) FIB.

The network route cache is used to provide subnet based route lookup functionality. The network route cache is searched using the destination address of a packet to be routed and if the cache contains a route to the destination address of the packet it will route the packet using the forwarding information from the matching route. Thus, the network route cache may be used as a cache to store a subset of all of the routes that are known to the router.

It is desirable to use a combination of a network route cache and host route cache efficiently such that the size of these two caches may be limited for a reduction in the cost of devices that employ these two caches. Therefore, there is need in the current technology for new methods and techniques that will effectively and efficiently use the limited amount of space in a network route cache.

Using present methods many routers store all of the active entries from their RIB, routing information base, in a high performance FIB that is used to make the majority of the routing decisions, and this is very expensive. These routers do not route packets using a network route cache, these routers route using the full set of active routes in the RIB along with optionally a host route cache. This requires a very large and expensive forwarding table in the high performance routing path. Embodiments of the invention allow routers to efficiently manage a network route cache; alternate mechanisms for maintaining such a cache (for example LRU [Least Recently Used] or random replacement) do not lead to efficient cache utilization.

Therefore, the current technology is limited in its capabilities and suffers from at least the above constraints.

SUMMARY OF EMBODIMENTS OF THE INVENTION

An embodiment of the invention ranks a set of routes in a network route cache in order of value. For the purposes of discussion in this disclosure the "value" of a route will be defined to be a function of the "breadth" and "frequency" of that route, where the function is an embodiment of the invention. The term "frequency" or "frequency of use" for a route refers to the number of packets per unit time that were routed using that route. The term "breadth" or "breadth of use" for a route refers to the number of distinct destination hosts that that route was used to route packets to per unit time. The value of a route can be used to determine whether or not that route should be stored in a network route cache, or if the individual destinations within that route should be stored in the host route cache on an as needed basis.

An embodiment of the invention allows the use of network routing caches to be optimized such that routes that are not used to route to a large number of destinations can be off-loaded into a less expensive host route cache.

An embodiment of this invention includes two components—a profiler and an analyzer. In an embodiment of a profiler, a method for a diversified host based route selection metric, includes: using an array indexed by a value, hash (Pkt.daIP), and written to with a packet destination address, Pkt.daIP, to profile the width and breadth of use for routes in a routing table.

In an embodiment of an analyzer, a method of evaluating the value, includes: configuring the profiler to profile subsets of routes in the network route cache and analyzing the profiler output for each subset of routes in the network route cache to determine the relative value of each route in the network route cache.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
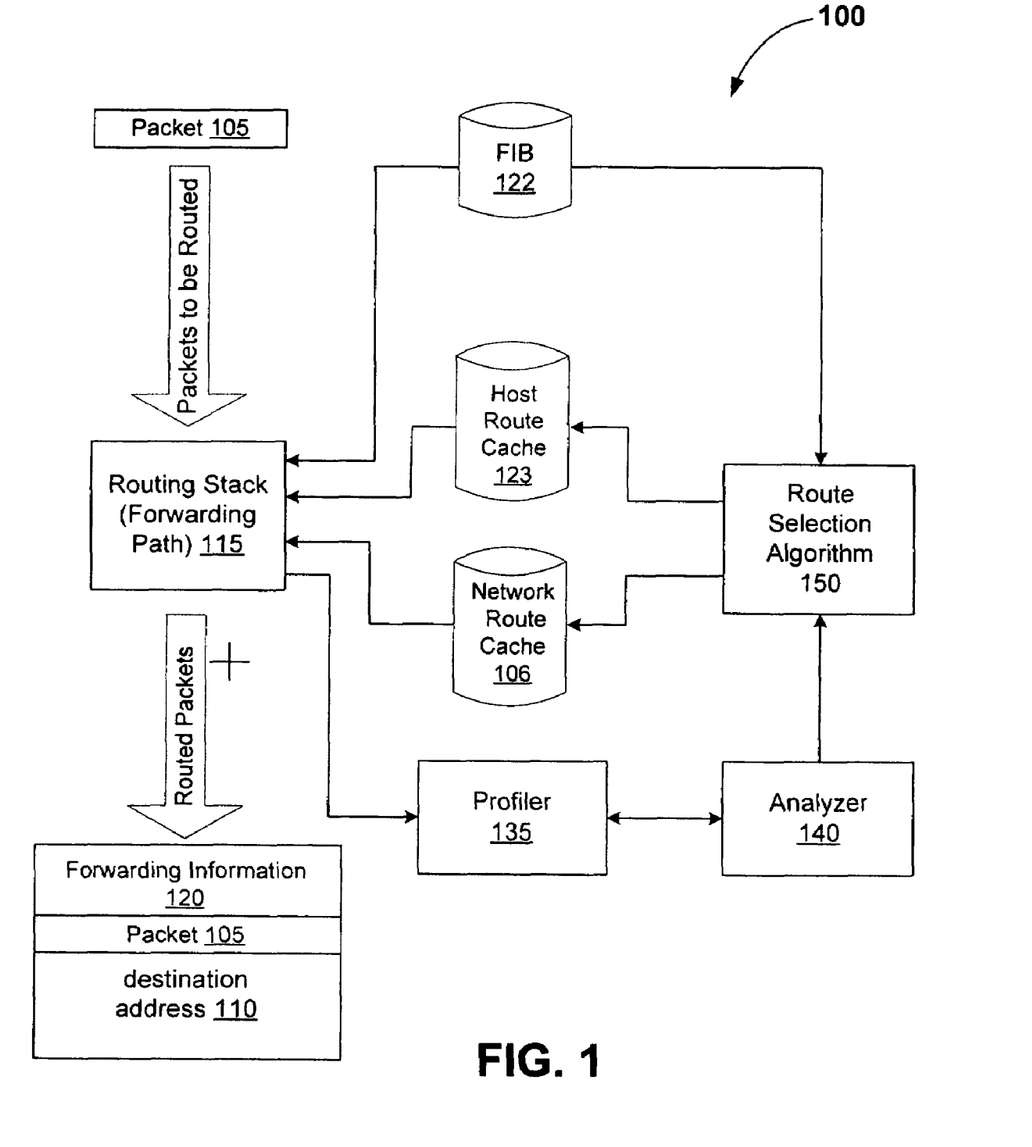
FIG. 1 is a block diagram of a router that can implement an embodiment of the invention.

Why it is Useful to Know the Breadth of Use and Frequency of Use:

FIG. 1 is a block diagram of a router 100 that can implement an embodiment of the invention. The router 100 can receive and route packets 105 using the routing stack 115. During the course of normal routing activity, packets 105 are received and routed by the routing stack 115. Typically the route selection algorithm 150 will program network routes into the network route cache 106 and host routes into the host route cache 123 as packets 105 are received. The route selection algorithm does this in order to reduce the number of lookups that are made into the FIB 122. The routing stack 115 is typically a combination of hardware and software that routes packets 105 toward the destination host specified as the destination address 110 in the packet. A router 100 uses a FIB and optionally some combination of a host route cache 123 and a network route cache 106 to find the appropriate forwarding information 120 to use to forward a packet 105. The forwarding information 120 specifies the path through the network that the packet 105 should follow and the operations that should be performed to alter the packet 105 before it is forwarded out of the system (these operations for IP routing over Ethernet include changing the source and destination MAC addresses of the packet.)

The network route cache 106 is a data structure that is accessed by the routing stack 115 to find the forwarding information 120 that should be used to forward packets 105. When a packet 105 is received, the network route cache 106 is searched with the destination address 110 of the incoming packet 105 to be routed. If the network route cache 106 contains a route to a particular destination, it will return to the routing stack 115 the forwarding information 120 for that destination address 110; otherwise the forwarding information will have to be found in the FIB 122 or host route cache 123 if one is present.

The host route cache 123 serves the same function as the network route cache 106; it is searched with the destination address 110 of the packet 105 and returns the forwarding information 120 for that packet 105. The difference between the network route cache 106 and the host route cache 123 is that an entry in the host route cache 123 matches one and only one destination address while a network route can be configured so that all destination hosts within a particular subnet will match that route.

The network route cache 106 can be implemented by any suitable structure such as a content addressable memory, linked list, tree structure, or any structure that can be searched for network routes that match destination addresses. The host route cache 123 can be implemented by any suitable structure such as a hash table, a content addressable memory, a tree, or any structure that can be searched for host routes that match destination addresses. Various additional known components and modules that permit the routing of a packet 105 are not shown in FIG. 1 to avoid obscuring the intent of embodiments of the invention.

An embodiment of the invention includes a profiler 135 and an analyzer 140; these elements provide the router 100 with data that a route selection algorithm 150 can use to optimize the use of the route caches 123 and 106. Unlike previous route profilers, a route profiler 135 in accordance with an embodiment of the invention provides a mechanism for measuring the relative value (where value is defined to be a function of frequency and breadth as described above) of all routes in the network route cache 106.

The ability to measure the relative value of a network route is useful in a router 100 that uses a combination of a network route cache 106 and a host route cache 123. The data collected by the profiler 135 is used by the analyzer 140 to rank the routes in the network route cache 106 in order of value. The ranking information that is generated by the analyzer 140 is then used by a route selection algorithm 150 to determine which routes in the routing table should be programmed into the network route cache 106; destinations that need to be routed to using a route that the route selection algorithm 150 does not place into the network route cache 106 will be routed using either host routes in the host route cache 123 or using the FIB 122.

The combination of the profiler 135 and the analyzer 140 allows the route selection algorithm 150 to select routes for a network route cache 106 so that the combination of a network route cache 106 and a host route cache 123 can be efficiently utilized such that the size of these two caches 106 and 123 may be reduced. Further the profiler 135 provides the analyzer 140 with sufficient information such that routing latency can be reduced when a route is removed from the network route cache 106 by the route selection algorithm 150. As a result of these two properties a router 100 with a profiler 135 and analyzer 140 may achieve high performance routing with significant cost savings by using a relatively small network route cache 106 and a relatively small host route cache 123.

Periodically, the analyzer 140 will analyze all entries in the profile table, gather statistics about those entries, and optionally record the set of IP addresses found in the profile table. This analysis may involve classifying the set of routes in the network route cache into subsets based upon value, as described in detail below. In this embodiment of an analyzer 140, the set of routes H will be split into N subsets Hi that will be profiled individually. Over time the analyzer 140 will move routes between these subsets such that the most valuable routes are stored in lower numbered subsets. Then when space is needed in the network route cache, routes in the lower valued subsets will be replaced before the routes in the higher valued subsets. The analysis performed by the analyzer 140 will generate a ranking for every route in the network route cache 106. (The routes will be ranked in order of their value.)

Based upon the ranking information generated by the analyzer 140 the route selection algorithm 150 will determine if a route should be placed in the network route cache 106 or if host routes for the destinations that this route has been used to route to recently should be programmed into the host route cache 123. In this embodiment the route profiler 135 keeps a record of the destination addresses that are in use within each route. This usage information may be used to program the host route cache 123 with entries to replace a network route in the network route cache 106. This way the forwarding decision latency is not increased significantly during the transition of the route from the network route cache 106 to the host route cache 123.

The route profiler 135 provides adequate information to select a subset of routes, H, from a set of all accessible routes in the FIB 122, S, such that when the subset of routes, H, is placed in the network route cache 106 (FIG. 1), the routing latency is reduced and the efficiency of any combination of a network route cache 106 and a host route cache 123 is improved. The route profiler 135 enables this improvement in efficiency by providing a measurement of the breadth and frequency of use for routes that are profiled; this measurement can be used to select the routes that should be programmed into the network route cache 106. As noted above, an accessible host is defined as a host that can be reached by a data packet 105 through the router 100 using a route known to the router 100. This known route is defined as an accessible route S.

The profiler 135 will typically be implemented using a hash table; however the method may use a list, instead of a hash table, for profiling route breadth and frequency. The method of the profiler 135 typically uses the destination address 110 of routed packets 105 as the sole input; however it may also use different inputs to the profiler 135 other than the destination address 110 of packets 105. These different inputs could possibly be used to measure the breadth and frequency of flows [the combination of source and destination information from a packet] as well as host routes. An embodiment of the profiler 135 may be designed so that the profiler 135 can be configured to profile only selected routes in the network route cache 106. The method of identifying routes to be profiled may be any suitable route identification method. The analyzer 140 that is used may also be varied.

An embodiment of the route profiler 135 can operate either as a hardware device or as a software algorithm and is used with a router 100 that routes with any suitable routing protocol that permits routing between networks by use of a routing table.

The route selection algorithm 150 will typically use this ranking information to select routes that should be removed from the network route cache 106 when existing routes need to be removed to make room for new routes. The route selection algorithm 150 will typically remove from the network route cache 106 the routes with the lowest rank first.

Typically the route selection algorithm 150 will remove one of the least valued routes when it needs to make room for a new route. When a new route is added the selection algorithm 150 will typically add that route to a subset Hi that is between the most valued, HO, and least valued subset HN; this subset will often be HP where P is N/2.

During the course of normal routing activity packets 105 are received and routed by the routing stack 115. Typically the route selection algorithm 150 will program network routes into the network route cache 106 and host routes into the host route cache 123 as packets 105 are received. The route selection algorithm 150 does this in order to reduce the number of lookups that are made into the FIB 122.

Figure 2:
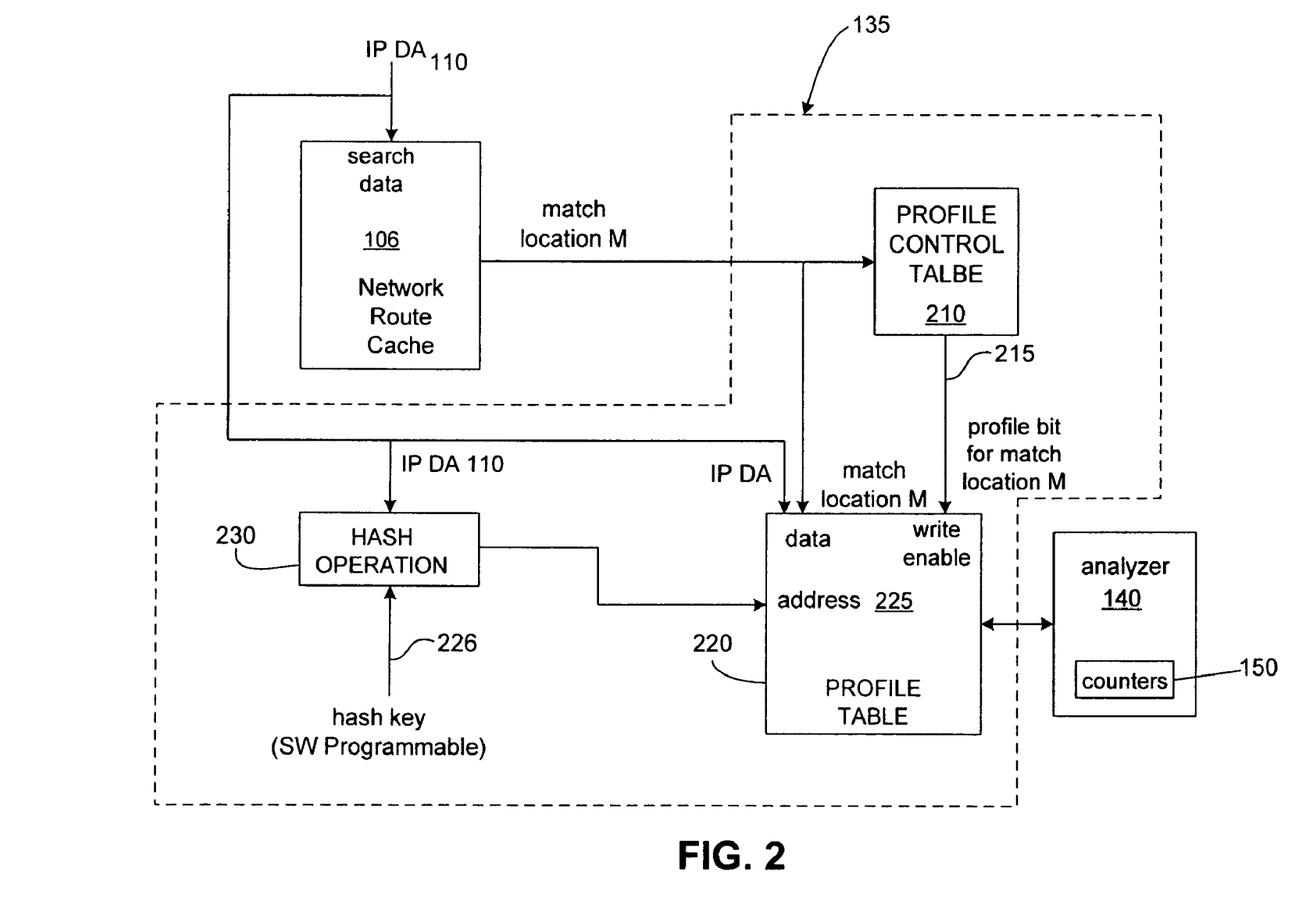
FIG. 2 is a block diagram of a route profiler, in accordance with an embodiment of the invention.

FIG. 2 is a block diagram of a route profiler 135, in accordance with an embodiment of the invention. An embodiment of the route profiler 135 generates information that the analyzer 140 can use to rank routes in the network route cache 106 in order of value. In an embodiment, the route profiler 135 typically includes the following elements as discussed below and operates with the network route cache 106, host route cache 123, and analyzer 140.

What follows is a brief description of the profiler components: 210, 230 and 220. The operation of these components 210, 230, and 220 will be described in greater detail with FIG. 4.

The profile control table 210 is used by the analyzer 140 to select a subset of the routes in the network route cache 106 to profile. Typically the router 100 would not profile all of the routes in the network route cache 106 simultaneously; the subset that is to be profiled is selected by programming the profile control table 210. In an embodiment, the profile control table 210 has one (1) profile bit 215 per entry in the network route cache 106. If a profile bit 215 is set in the profile control table 210 for a corresponding entry in the network route cache 106, then this means that profiling is enabled for the corresponding network route cache entry. The profile control table 210 will typically be programmed by the analyzer 140.

The hash operation performed by the module 230 is used to index the profile table 220. This hash operation 230 typically involves the use of a hash key 226 that can be programmed to vary the hash function that is used. The programmable hash operation performed by the module 230 is used to take the destination address from a packet that is being routed and generate an index into the profile table 220. As known to those skilled in the art, hashing is the transformation a set of bits, or any numerically represent able value, into a usually smaller fixed-length value or address that represents the original value. It is noted that it is within the scope of embodiments of the invention to use all suitable hash functions. For example, this set of suitable hash functions includes the function, hash (DA)=DA.

The profile table 220 is typically a random access memory that is addressed with the hash value specified by the hash operation 230 and is written to with information about a routed packet. The write operation is controlled with a write enable bit 215 that is typically supplied from the profile control table 210. For this embodiment the information that is written to the hash table for each packet that is routed using a profiled route in the network route cache 106 is the destination address of the packet and the match location M of the route in the network route cache that was used to route the packet. The match location M uniquely identifies the route in the network route cache that was used to route the packet.

This write operation to the profile table 220 will overwrite any existing data at the calculated particular hash address 225, and as a result of this write operation, the profiling operation should be viewed as a sampling process. It is, therefore, typically necessary to perform a profiling operation repeatedly using a different hash key 226 for each cycle of the profiling operation, this is done to gain a more accurate picture of the value of a route in the network route cache.

Periodically, an analyzer 140, will analyze all entries in the profile table 220, gather statistics about those entries, and optionally record the set of IP addresses found in the profile table. The purpose of the analyzer 140 is to rank the routes in the network route cache in order of value such that the route selection algorithm can intelligently decide which routes to leave in the cache and which to remove. The analyzer 140 will be discussed in greater detail below.

It is noted that the network route cache 106, profile control table 210, and profile table 220 include functions with logic circuitry and/or software that permits read and write operations to the network route cache 106, Profile Control Table 210, and Profile Table 220.

Figure 3:
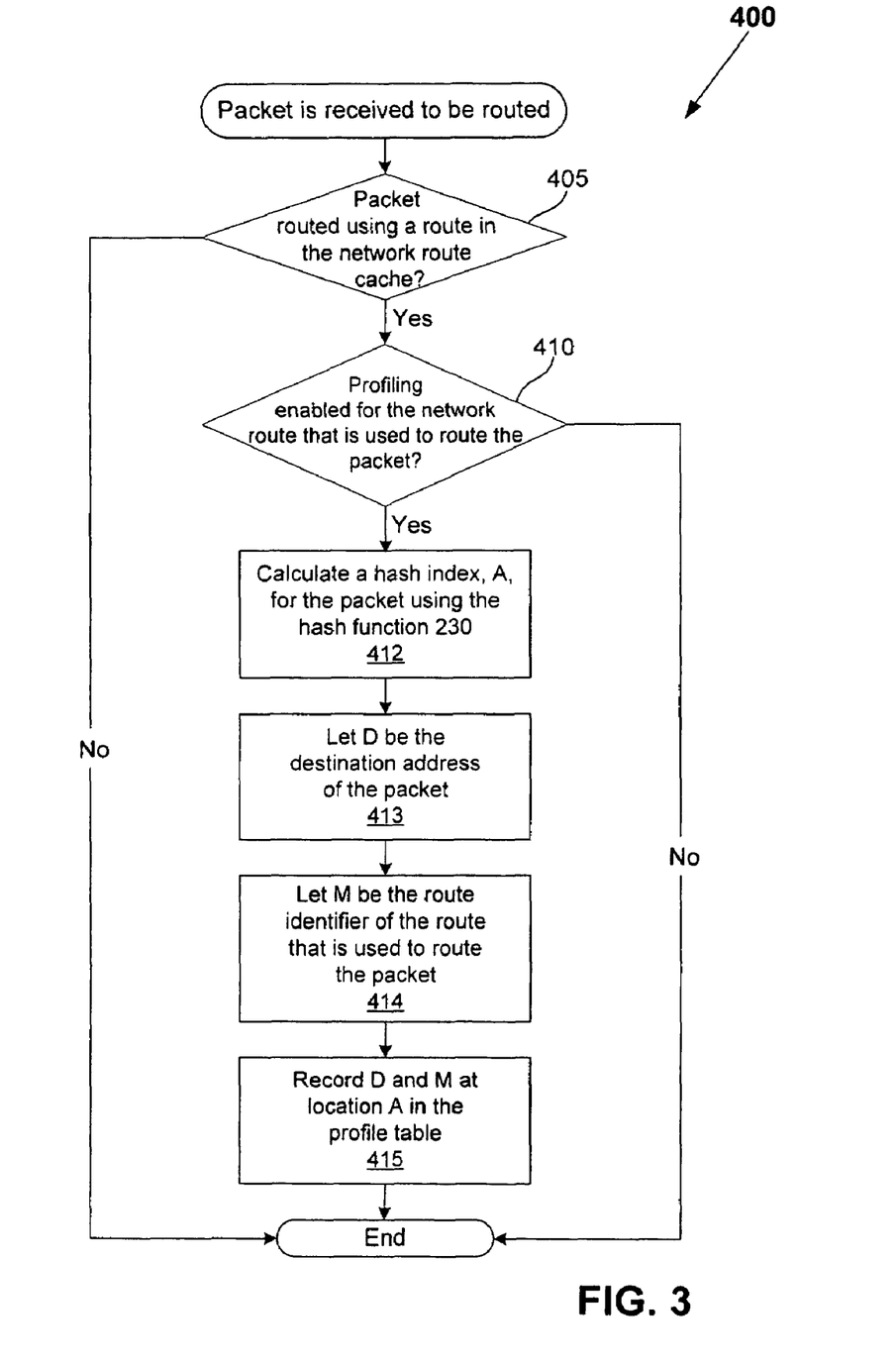
FIG. 3 is a flowchart of the method of a profiler in accordance with an embodiment of the invention.

FIG. 3 is a flowchart of a method 400 in accordance with an embodiment of the invention. A determination is made (405) if there is a route in a network route cache 106, M, that should be used to route a received packet 105. If a route (in the network route cache) is used to route the received packet 105, then a determination is made (410) if the route M is a profiled route (i.e., a route that is marked for profiling in the profile control table 210).

If the packet 105 is routed using a profiled route from the network route cache 106 then information will be written in the profile table in response to the packet 105 at a location specified by the hash operation 230. In an embodiment of the invention the information that will be written into the profile table 220 will be the destination address 110 of the packet and the identifier, M, of the network route in the network route cache 106 that was used to route the packet.

This write operation allows the profiler 135 to build up a pseudo random sample of destination addresses from packets that were routed using profiled routes. An analyzer 140 can use this sample of destination addresses to determine the value of each profiled route relative to the value of all the other profiled routes. The analyzer 140 can use this information to rank routes in the network route cache in order of value.

As an example, an IP destination address 110 of an incoming packet 105 is at 1.2.3.4, with a match location M where M=23, and the hash operation address 225 is at address=123. If the profile bit 215 has a value of 1 to indicate profiling of the route, then the destination IP address 110 and the match location M are written into the profile table 220 at address=123. The destination address 110 of the next received packet 105 is then analyzed in the same manner.

It is noted that multiple profile control tables 210 and multiple associated profile tables 220 can be used in FIG. 2, in order to simultaneously perform the profiling of multiple subsets of routes.

Figure 4:
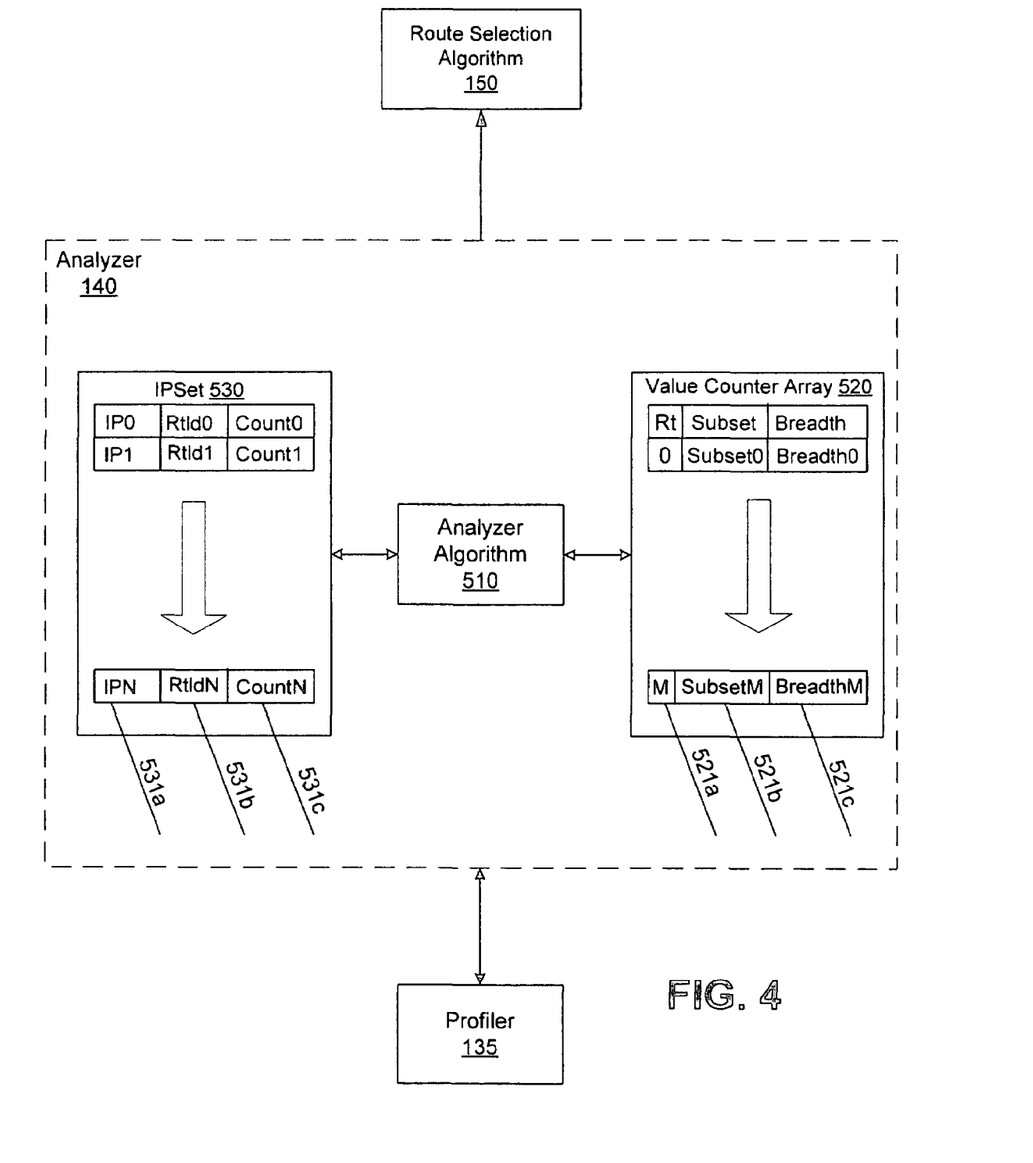
FIG. 4 is a block diagram of an analyzer, in accordance with an embodiment of the invention.

FIG. 4 is a block diagram of an embodiment of an analyzer 140. In an embodiment, the analyzer 140 typically includes the following elements as discussed below and operates with the profiler 135 and the route selection algorithm 150. The elements of an embodiment of an analyzer 140 include a set IP Set 530, a value counter array 520, and an analyzer algorithm 510.

IP Set 530 stores a set of structures 531 that contain an IP address 531a, a route identifier 531b and a count value 531c. Each structure 531 in IP Set 530 is uniquely identifiable by the IP address 531a field. No two distinct structures 531 in IP Set 530 will have the same IP address 531a. Elements can be added or deleted from IP Set 530. IP Set 530 can be searched by IP address, if an IP address is present in the set then IP Set 530 can be queried for the count value or the route identifier associated with that IP address and the count or route identifier will be returned. In addition if an IP address is present in IP Set 530 then the count value or route identifier associated with that IP address can be modified. Also IP Set 530 can be read, for example, linearly such that each entry 531 is read one after another. However, in practice the IP Set 530 can be read by any suitable order, as the IP Set 530 is typically data stored in memory (e.g., Random Access Memory). IP Set 530 is used to keep a record of all of the IP addresses that have been seen in the profiler table 220 along with their associated frequency count and the route identifier of the route that was used to route to that address.

The value counter array 520 represents an array of counter structures 521. Each counter structure in the array 521 corresponds to a particular route in the network route cache; entry x in the value counter array 520 corresponds to entry x in the network route cache. Each counter structure 521 is formed by a subset identifier 521b and a breadth count 521c, together these reflect the counters "value" as measured by the profiler 135 and analyzer 140. The value of value counters can be compared; two comparison methods are below:

1.) A value counter V1 is less valuable than another value counter V2 if (V1.subset>V2.subset) or if ((V1.subset==V2.subset) and (V1.breadth<V2.breadth)).

2.) Two value counters, V1 and V2, are equivalent if ((V1.subset==V2.subset) and (V1.breadth==V2.breadth)).

The analyzer algorithm 510 periodically collects data from the profiler 135 and recalculates the IP Set 530 and value counters 520 based upon the contents of the profile table 220 in the profiler 135. The method that one embodiment of an analyzer algorithm 510 uses to generate the IP Set 530 and value counters 520 is described in FIG. 5.

Figure 5:
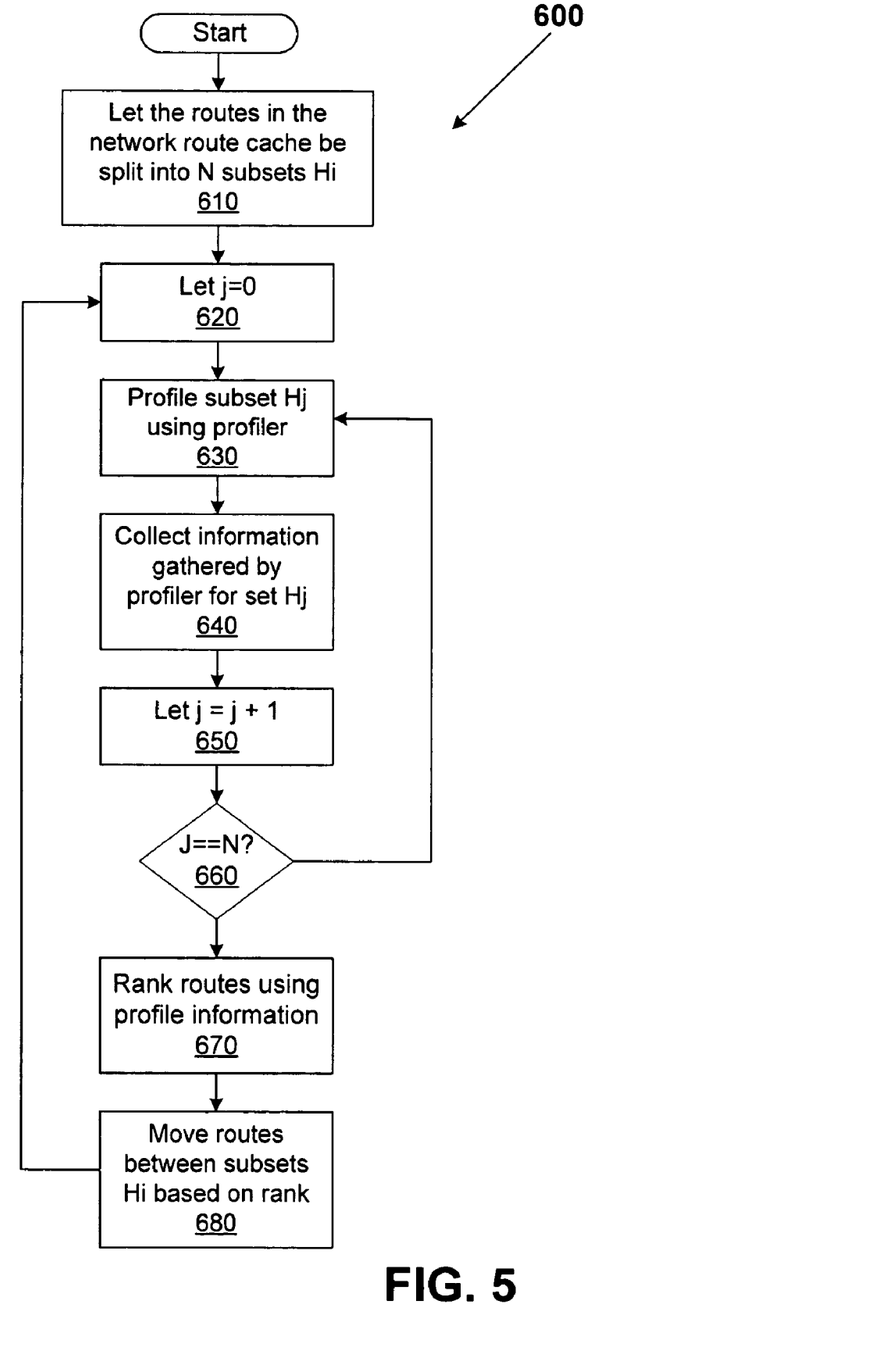
FIG. 5 is a flowchart of a method of an analyzer in accordance with an embodiment of the invention.

FIG. 5 is a flowchart of a method 600 in accordance with an embodiment of the invention.

The analyzer method 600 will typically begin executing after the router 100 begins initializing during boot and before the route selection algorithm 150 has programmed any routes into the network route cache 106. At this time the network route cache will be empty and as a result all of the N subsets Hi will also be empty. As execution of the method 600 progresses the route selection algorithm 150 will add and remove routes from the network route cache. When the route selection algorithm 150 adds a new route to the network route cache it must assign that route to a subset Hi. During execution of the method 600 routes will be moved between subsets.

The analyzer will begin execution at step 610 and continue on to step 620. At step 620 the method sets value j of method 600 to 0. At step 630 the analyzer programs the profiler to profile a subset, Hj, of routes in the routing table and then pauses a period of time T1 (the sampling period) while the profiler profiles a subset of routes Hj.

Following step 630 the analyzer will gather the information collected in the profiler during step 630. For each entry in the profiler table 220 the analyzer will check IP Set 530 to determine if the address, "A1", for that entry appears in IP Set 530; if there is no entry in IP Set with the address "A1" it will create one using address A1 for the address 531a, the route identifier from the profile table for the route identifier 531b and MAX_COUNT for the count value 531c; if there already is an entry in IP Set for the address "A1" then it will overwrite the existing entry's count value with MAX_COUNT and will overwrite the route identifier 531b with the route identifier from the entry in the profiler table 220. Once the analyzer has taken all the IP addresses that appeared in the profile table 220 and used them to update IP Set it will turn off profiling for all routes and it will clear the profiler table and proceed to step 650. A typical value for MAX_COUNT will be two (2); a typical value for N will be eight (8). MAX_COUNT is a value that is used to specify the number of sampling periods that an IP address that isn't found in the profile table 220 will be left in IP Set 530.

For step 650 it will increment j by one, then in step 660 it will check to see if j specifies a valid subset Hj. If j specifies a valid set it will jump to step 630, otherwise it will continue on to step 670.

For step 670 the analyzer method 600 will take the information gathered in IP Set 530 and use it to rank the routes in the network route cache. Step 670 will begin by generating a value counter for every route in the network route cache based upon the information in IP Set 530. Step 670 will iterate through all of the entries in IP Set 530 and for each entry, E1, 531 it will add the count value 531c to the value count 521 of the value counter 521 that is associated with the route identifier of the current entry, E1. (ValueCountersArray[route identifier 531*b*].value+=count 531*c*) After the value counters are updated as described above the routes will be ranked in order of value based upon their corresponding entries in the value counters array 520. A route, "R1", in the network route cache 106 will be considered more valuable than another route, "R2", if their respective counter values "C1" and "C2" are such that C1>C2. This ranking information will be provided to the route selection algorithm 150 whenever it requests it. After the rankings have been generated the analyzer method will decrement the count value 531*c* for every entry in IP Set, every entry 531 that has a count value 531*c* of 0 after its count is decremented will be deleted from IP Set 530.

Step 680 follows step 670, during step 680 the routes in the network route cache will be repartitioned into subsets Hj such that the all the subsets Hj are similar in size and such that some of the most valuable routes (as determined in step 670) from each subset are promoted into a more valuable subset and such that some of the least valuable routes (as determined in step 670) from each subset are demoted into a less valuable subset. Following step 680 the method 600 will loop back to step 620.

The method uses the set of addresses 110 that appear in the profile table 220 over a sampling period T1 to measure the relative value of maintaining each route in a subset of routes, Hi, in the network route cache 106. This sampling period occurs during step 630.

EXAMPLE USAGE

What follows is a brief example of the route profiler 135 and analyzer 140 in use. Suppose that a router has a network route cache with 6 routes in it, R1 through R6. Further suppose that these routes are initially divided into groups as shown in Table 1. Further suppose that the router has an embodiment of the route profiler as described in FIG. 2; this embodiment has a profile table 220 with 8 entries. Table 1 represents the state of the value counters array 520 before the analyzer 140 begins with step 610.

TABLE 1

| Value Counters | | |
|---|---|---|
| Route # | Subset | Value |
| 1 | 0 | 0 |
| 2 | 0 | 0 |
| 3 | 0 | 0 |
| 4 | 1 | 0 |
| 5 | 1 | 0 |
| 6 | 1 | 0 |

The router uses an embodiment of an analyzer 140 as described by FIGS. 4 and 5. For this embodiment of an analyzer the MAX_COUNT will be 2 and N will be 2. The routes begin evenly distributed between 2 subsets as required by step 610 of the analyzer method. The analyzer then runs to step 630, during step 630 the profiler profiles subset 0, H0. Table 2 describes the contents of the profiler table 220 after step 630.

TABLE 2

| Profiler Table | | |
|---|---|---|
| Entry # | Address | Route # |
| 0 | | |
| 1 | A1 | 1 |
| 2 | A7 | 1 |
| 3 | | |
| 4 | A2 | 3 |
| 5 | | |
| 6 | A6 | 6 |
| 7 | | |

This Table 2 was generated during the sampling period of step 630 while profiling subset 0. During this period at least four packets were received—one destined for address A1, one for A7, one for A2 and one for A6. The hash function 230 translated these addresses, A1, A7, A2 and A6 into the hash values 1, 2, 4 and 6 respectively. The analyzer then proceeds to analyze this sample in step 640. Table 3 represents the contents of IP Set 530 after step 640.

TABLE 3

| IP Set | | |
|---|---|---|
| Address | Route # | Count |
| A1 | 1 | 2 |
| A7 | 1 | 2 |

After step 640 the analyzer runs through steps 650, 660, 630 and 640 again, this time steps 630 and 640 apply to subset 1, H1. This time only one address is found in the profiler table, it is A2 and was routed to using route 3. Table 4 represents the contents of IP Set 530 after step 640 has run a second time.

TABLE 4

| IP Set | | |
|---|---|---|
| Address | Route # | Count |
| A1 | 1 | 2 |
| A7 | 1 | 2 |
| A2 | 3 | 2 |
| A6 | 6 | 2 |

After step 640 the analyzer runs through step 650, 660 and 670. Step 670 cleared the value field for every route in the value counters array and then the count value from each address found in the IP set 530 was taken and added to the value for that addresses associated route in the value counters array 520 during step 670. Table 5 represents the value counter array 520 after executing step 670 for the first time.

TABLE 5

| Value Counters | | |
|---|---|---|
| Route # | Subset | Value |
| 1 | 0 | 4 |
| 2 | 0 | 0 |
| 3 | 0 | 2 |
| 4 | 1 | 0 |
| 5 | 1 | 0 |
| 6 | 1 | 2 |

After step 670 the route subset assignments will be adjusted based upon each routes rank within their current subset. In this example the analyzer will swap two routes between subsets 0 and 1. Since route 2 is the least valuable member of subset 0 the analyzer moves route 2 from subset 0 to a less valuable subset, subset 1. Since route 6 is the most valuable member of subset 1 the analyzer moves route 6 from subset 1 to a more valuable subset, subset 0. The value counters array 520 subset field 521b will not be adjusted to reflect the changed subset assignments until the next time step 670 runs. However step 630 will use the new subset assignments generated during step 680 immediately.

Once step 680 completes steps 620 through 660 are rerun for both subsets. Table 6 describes the contents of IP Set After steps 630 and 640 have been rerun for both subsets 0 and 1.

TABLE 6

| IP Set | | |
|---|---|---|
| Address | Route # | Count |
| A1 | 1 | 2 |
| A7 | 1 | 1 |
| A2 | 3 | 2 |
| A6 | 6 | 1 |
| A8 | 1 | 2 |
| A4 | 2 | 2 |

During step 640 the analyzer 140 found one instance of each of the following addresses: A1, A2, A8 and A4. No instances of the addresses A7 or A6 were found in the profiler table 220 and as a result the count values for those addresses in IP Set 530 were decremented.

Table 7 reflects the value counters array 520 after step 670 and 680 have each run again.

TABLE 7

| Value Counters | | |
|---|---|---|
| Route # | Subset | Value |
| 1 | 0 | 5 |
| 2 | 1 | 2 |
| 3 | 0 | 2 |
| 4 | 1 | 0 |
| 5 | 1 | 0 |
| 6 | 0 | 1 |

Based upon the value counters in Table 7 the analyzer chooses to swap two routes, route 2 and route 6. Route 2 is moved to the higher valued subset, subset 0 because it is currently the most valuable member of subset 1. Route 6 is moved to the lower valued subset, subset 1 because it is currently the least valuable member of subset 0.

Once step 680 completes a second time steps 620 through 660 are rerun for both subsets. Table 8 describes the contents of IP Set After steps 630 and 640 have been rerun for both subsets 0 and 1.

TABLE 8

| IP Set | | |
|---|---|---|
| Address | Route # | Count |
| A1 | 1 | 1 |
| A2 | 3 | 2 |
| A6 | 6 | 2 |
| A8 | 1 | 1 |

TABLE 8-continued

| IP Set | | |
|---|---|---|
| Address | Route # | Count |
| A4 | 2 | 1 |
| A5 | 5 | 2 |
| A9 | 1 | 2 |
| A3 | 4 | 2 |

During step 640 the analyzer 140 found one instance of each of the following addresses: A2, A6, A5, A9 and A3. No instances of the addresses: A1, A7, A8 or A4 were found in the profiler table 220 and as a result the count values for those addresses in IP Set 530 were decremented. The count value for A7 dropped to 0 when it was decremented and as a result address A7 was removed from IP Set 530.

Table 9 reflects the value counters array 520 after step 670 and 680 have each run again.

TABLE 9

| Value Counters | | |
|---|---|---|
| Route # | Subset | Value |
| 1 | 0 | 4 |
| 2 | 0 | 1 |
| 3 | 0 | 2 |
| 4 | 1 | 2 |
| 5 | 1 | 2 |
| 6 | 1 | 2 |

Based upon the value counters in Table 9 the analyzer chooses to swap two routes, route 2 and route 4. Route 4 is moved to the higher valued subset, subset 0 because it is currently one of the most valuable members of subset 1. Route 2 is moved to the lower valued subset, subset 1 because it is currently the least valuable member of subset 0.

The analyzer will continue to run in this fashion until the router stops the analyzer task. This is an example of the analyzer operation.

Why Embodiments of the Invention Function

In this embodiment the value counter 521 associated with a route in the network route cache approximates the relative value that route. The measured "value" is a function of both the frequency and breadth of that route. The subset Hi in which a particular route is placed by the analyzer method 600, and the relative standing that route will have within its subset Hi, will depend on both the frequency and the breadth of that particular route. If, for example, two (2) particular routes, R1 and R2, in a particular subset Hi, have the same breadth value, but R1 is used more frequently (has a higher frequency value), then R1 will have a greater value as measured by this invention than route R2. Similarly, if two (2) particular routes, R1 and R2 are used with equal frequency, but R1 is used for a larger set of destinations (has greater breadth), then R1 will have a greater value as measured by this invention than R2.

These properties of the profiler can be better understood with the following examples.

1.) Suppose the router is profiling two routes R1 and R2 in a subset Hi. Further suppose that the router is using route R1 to route 40,000 packets per second evenly distributed between 5,000 unique destinations, additionally the router is using route R2 to route 10,000 packets per second evenly distributed between 5,000 unique destinations. These two routes R1 and R2 then have equal breadth but one of the two routes, R1, is used more frequently than the other route, R2. Given this traffic pattern then any time the profiler is analyzed there will be more entries in the profile table that are associated with route R1 than with route R2. As a result after a sampling period T1 route R1 will have a greater measured value than R2 as measured by evaluating a sample from the profile table 220 in the profiler 135. Given a random distribution of packets and a suitably long sampling period T1 the ratio of the number of entries associated with R1 to the number of entries associated with R2 found in the profiler table 220 will approximately equal: 4/1==4.

2.) Suppose the router is profiling two routes R1 and R2 in a subset Hi. Further suppose that route R1 is used to route 10,000 packets per second evenly distributed between 15,000 unique destinations, and that route R2 is used to route 10,000 packets per second evenly distributed between 5,000 unique destinations. These two routes then have equal frequency of use but one route, route R1, is used to route to a larger number of destinations (has greater breadth) than the other route R2. As a result route R1 will have a greater measured value than R2 as measured by evaluating a sample from the profile table 220 in the profiler 135. Given a random distribution of packets and a suitably long sampling period T1 the ratio of the number of entries associated with R1 to the number of entries associated with R2 found in the profiler table 220 will approach 3/1==3 as the size of the profiler table 220 grows. (Typically the profiler table will be fixed in size for a particular embodiment of this invention, this example shows a relationship between the selected size of the profiler table and the sampling characteristics of an embodiment of the invention.)

How Embodiments of the Invention can be Revised to Change its Performance Characteristics Many of the characteristics the embodiments described by FIGS. 2, 5, and 6 can be varied in order to vary the performance characteristics of these embodiments.

Given an embodiment of an analyzer 140 as described above with FIGS. 4 and 5 the sampling period T1, the hash function that is programmed into 230, and the subset count N can all be varied to change the performance characteristics of the embodiment.

The selected sampling period T1 has an effect on the amount of influence breadth has on the measured value of routes. As the sampling period T1 approaches 0, breadth of use begins to influence the measured value of routes more and more. When the sampling period T1 equals the minimum amount of time, MTime, that will elapse between two packets received by the routing path 115 and the number of subsets N is 1 the destination for each and every packet routed will appear in the profile table during analysis. When the sampling period T1 equals MTime and the number of subsets N is 1 the measured value becomes almost entirely a function of breadth; with these configuration parameters frequency has a much weaker influence on the measured value than breadth. As the sampling time T1 grows bigger than MTime frequency of use begins to influence the measured value more. Typically the sampling period T1 will be much larger than MTime, MTime is used as an example to show how varying T1 varies the sampling characteristics of the profiler.

Additionally the subset count N may be varied to increase the influence of breadth on the measured values. When the profile table is saturated (nearly all of the entries in the table have been written to in a sampling period) each route in a subset Hi will have on average PTS/HIS entries associated with them, where PTS is the number of entries in the Profile Table 220 and HIS is the number of routes in the subset Hi. This ratio PTS/HIS reflects the minimum average number of destinations that are in use within each route in a subset Hi, if that subset is saturating the profile table during its sampling period. Once the average number of hosts per route in a subset Hi grows to exceed PTS/HIS the measured values for routes within Hi becomes more a function of frequency than of breadth. The subset count N may be increased to increase the PTS/HIS value to increase the influence of breadth on the measured route values.

The size of the profile table 220 in the profiler 200 also has an influence on the influence of breadth on the measured values of routes in the network route cache 106. The size of the table affects the PTS/HIS ratio that was discussed above. Increasing the size of the profile table 220 increases the influence breadth has on the measured value of routes.

And finally the hash function can be varied between sampling periods in order to generate a more complete list of all of the destinations that the router is sending packets to.

Alternate Solutions:

Three alternative solutions may be used but have various problems. First, a large network route cache may be used. The network route cache may have as many entries as there are active routes in the FIB, in this case it isn't necessary to profile the routes for inclusion in the network route cache because in this case all of the active entries are always present. The disadvantage of this method is that it requires a very large and expensive high performance network route table. Furthermore, since this large network route table would most likely have to be off-chip, the network route table would perform poorly compared to a system that uses on-chip network route caches. A route profiler is not necessary in this architecture because every route in the host route cache has a corresponding route in the high speed network route table.

Second, dirty bits may be used for each route in the network route cache such that each time a network route cache entry is used, the entry's dirty bit is cleared. The route selection algorithm could then use these dirty bits in an LRU replacement strategy. The disadvantage of this method is that it only takes into account the frequency of use for each route in the network route cache and does not take into account the breadth of use for each network route cache entry. As a result, the system in the router will require a significantly larger host route cache because it will use the network route cache entries inefficiently.

Third, the routes can be placed in the network route cache whenever the system in the router receives a packet that uses that route to get to its next hop destination. When the network route cache is full, then randomly select routes to be discarded from the network route cache. The disadvantage of this method is that it does not consider either the frequency of use of the breadth of use for any of the routes in the network route cache. This will result in an inefficient use of the network route cache and a degradation of routing performance, and will require a larger host route cache.

The various engines, tools, or modules discussed herein may be, for example, software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

While the present invention has been described herein with reference to particular embodiments thereof, a latitude of modification, various changes and substitutions are intended in the foregoing disclosures, and it will be appreciated that in some instances some features of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. A method for a diversified host based route selection metric, the method comprising:

using a diversified route profile table to measure values of a plurality of route information in a routing cache;

wherein a value is based on a breadth of use for a route and a frequency of use for the route, wherein the breadth of use indicates a number of destinations of packets in a sampling period for the route, and wherein the frequency of use indicates a number of packets that were transmitted along the route in the sampling period; and removing, from the routing cache, a route information with a lowest value and subsequently adding a new route information to the routing cache.

2. The method of claim 1, wherein data collected in the table is used by an analyzer to rank the routes based on the values of the routing information.

3. The method of claim 1, wherein the rank of the routes is used by a route selection algorithm to determine which routes in a routing table should be programmed into a network route cache.

4. The method of claim 1, wherein the routing cache comprises a network route cache and a host route cache.

5. The method of claim 4, wherein the use of the network routing cache is optimized such that routes that are not used to route to a large number of destinations can be offloaded into the host route cache.

6. The method of claim 4, wherein the use of the network routing cache is optimized such that routes that are used to route to a large number of destinations are stored in the network routing cache.

7. The method of claim 1, further comprising:

using a set of IP addresses that appear in a profile table, over the sampling period to measure the value of maintaining each route in a route cache.

8. The method of claim 7, wherein the route cache is a routing table that only contains a subset of all the routes that are known by the router knows.

9. The method of claim 1, further comprising:

assigning each route information, in a route cache, a unique identifier that can be inserted into a recorded data for each address that is programmed into the profile table, in order to improve the efficiency of evaluating routes in the routing cache.

10. The method of claim 1, further comprising:

using a programmable hash function to generate the hash value hash(Pkt.daIP).

11. The method of claim 1, further comprising:

varying a hash function that is used between sampling periods for the same route set in order to improve the quality of the data that is collected.

12. The method of claim 1, further comprising:

shortening the time of the sampling period in order to obtain a more complete list of IP addresses that are using a particular set of routes.

13. The method of claim 12, wherein if the time of the sampling period is shortened to correspond to the length of time that it takes to transmit a single packet, then a complete list of all IP addresses that are using a particular set of routes can be generated.

14. The method of claim 1, further comprising:

adding a counter to each hash entry in a profile table, where the counter will be incremented for each time that a hash entry is written to.

15. The method of claim 1, further comprising:

adding a counter for each hash entry in a profile table, where the counter will be incremented every time the hash entry is written with the same IP address and is reset every time the entry is written with a new IP address.

16. The method of claim 1, further comprising:
using a list instead of a hash for profiling route breadth and frequency.

17. The method of claim 1, further comprising:
using different inputs to a profiler other than the destination address of packets.

18. The method of claim 17, wherein the different inputs are used to measure the breadth and frequency of flows as well as host routes.

19. The method of claim 1, further comprising:
identifying routes by use of suitable identifier technique.

20. An apparatus for a diversified host based route selection metric, the apparatus comprising:
a device including a routing cache and a route profiler configured to use a diversified host route metric hash to measure values of a plurality of route information in the routing cache;
wherein a value is based on a breadth of use for a route and a frequency of use for the route, wherein the breadth of use indicates a number of destinations of packets in a sampling period for the route, and wherein the frequency of use indicates a number of packets that were transmitted along the route in the sampling period;
said device including a route selection algorithm configured to remove, from the routing cache, a route information with a lowest value and subsequently add a new route information to the routing cache.

21. The apparatus of claim 20, wherein the breadth of use and frequency of use are used by an analyzer to rank the routes based on the values of the route information.

22. The apparatus of claim 20, wherein the rank of the routes is used by a route selection algorithm to determine which routes in a routing table should be programmed into a network route cache.

23. The apparatus of claim 20, wherein the routing cache comprises a network route cache and a host route cache.

24. The apparatus of claim 20, wherein the use of the network routing cache is optimized such that routes that are not used to route to a large number of destinations can be offloaded into the host route cache.

25. The apparatus of claim 20, wherein the use of the network routing cache is optimized such that routes that are used to route to a large number of destinations are stored in the network routing cache.

26. The apparatus of claim 20 wherein the route profiler is configured to use a set of IP addresses that appear in a profile table, over the sampling period to measure the value of maintaining each route in a route cache.

27. The apparatus of claim 26, wherein the route cache is a routing table that only contains a subset of all the routes that are known by the router.

28. The apparatus of claim 20, wherein the route profiler is configured to assign each route information, in a route cache, a unique identifier that can be inserted into a recorded data for each address that is programmed into a programmable hash function, in order to improve the efficiency of evaluating routes in the routing cache.

29. The apparatus of claim 20, wherein the route profiler is configured to use a programmable hash function to generate the hash value hash (Pkt.daIP).

30. The apparatus of claim 20, wherein the route profiler is configured to vary a hash function that is used between successive sampling periods for the same route set in order to improve the quality of the data that is collected.

31. The apparatus of claim 20, wherein the route profiler is configured to shorten the time of the sampling period in order to obtain a more complete list of IP addresses that are using a particular set of routes.

32. The apparatus of claim 20, wherein if the time of the sampling period is shortened to correspond to the length of time that it takes to transmit a single packet, then a complete list of all IP addresses that are using a particular set of routes can be generated.

33. The apparatus of claim 20, wherein the route profiler further comprises:
a counter to each hash entry in a profile table, where the counter will be incremented for each time that a hash entry is written to.

34. The apparatus of claim 20, wherein the route profiler further comprises:
a counter for each hash entry in a profile table, where the counter will be incremented every time the hash entry is written with the same IP address and is reset every time the entry is written with a new IP address.

35. The apparatus of claim 20, wherein the route profiler is configured to use a list instead of a hash for profiling route breadth and frequency.

36. The apparatus of claim 20, wherein the route profiler is configured to use different inputs other than the destination address of packets.

37. The apparatus of claim 20, wherein the different inputs are used to measure the breadth and frequency of flows as well as host routes.

38. The apparatus of claim 20, wherein the route profiler is configured to identify routes by use of suitable identifier technique.

39. An apparatus for a diversified host based route selection metric, the apparatus comprising:
a device including a routing cache and means for using a diversified route profile table to measure values of a plurality of route information in the routing cache;
wherein a value is based on a breadth of use for a route and a frequency of use for the route, wherein the breadth of use indicates a number of destinations of packets in a sampling period for the route, and wherein the frequency of use indicates a number of packets that were transmitted along the route in the sampling period;
said device including means for removing, from the routing cache, a route information with a lowest value and subsequently adding a new route information to the routing cache.

40. An article of manufacture, comprising:
a machine-readable medium having stored thereon instructions to:
use a diversified route profile table to measure values of a plurality of route information in a routing cache;
wherein a value is based on a breadth of use for a route and a frequency of use for route, wherein the breadth of use indicates a number of destinations of packets in a sampling period for the route, and wherein the frequency of use indicates a number of packets that were transmitted along the route in the sampling period; and
remove, from the routing cache, a route information with a lowest value and subsequently adding a new route information to the routing cache.

* * * * *